May 4, 1926.
G. H. SAUTON
ELECTRIC METER PROTECTING MEANS
Filed August 4, 1924
1,583,608
3 Sheets-Sheet 1
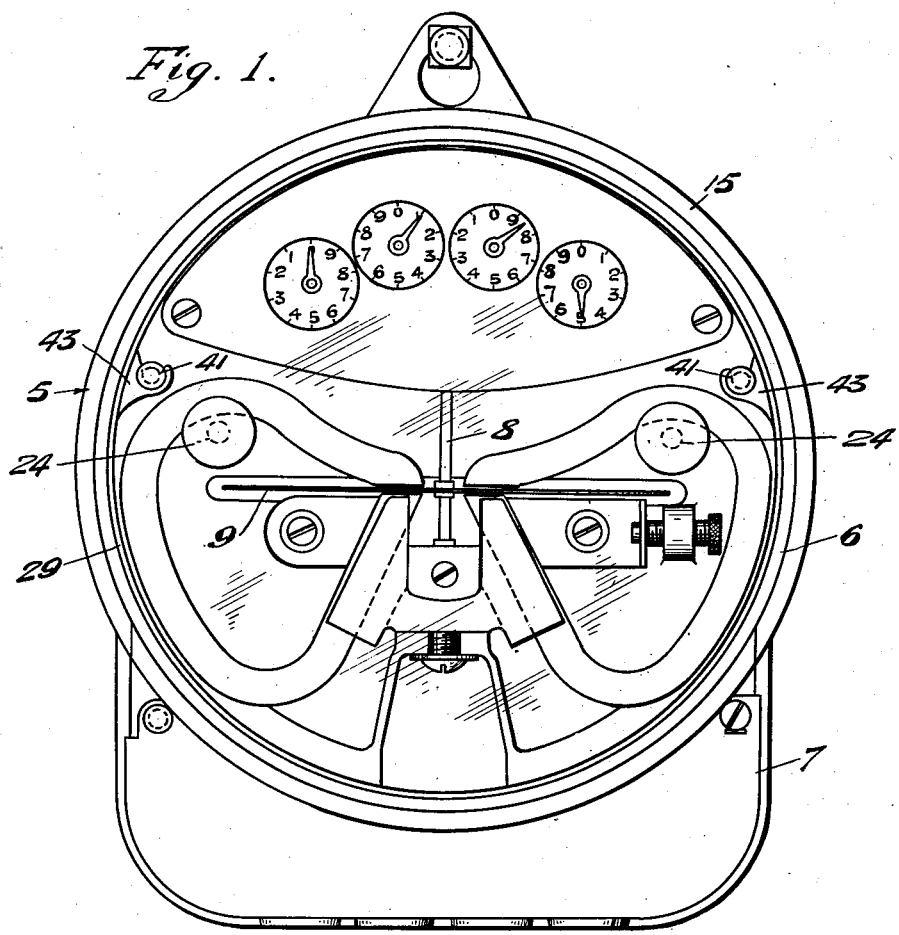
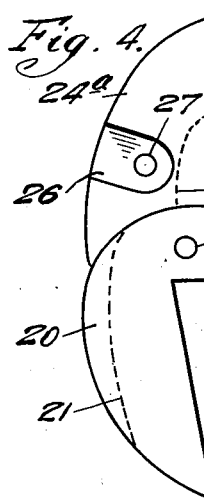
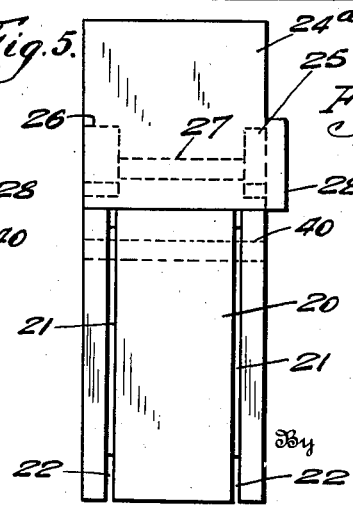
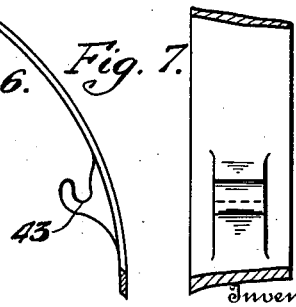
Inventor
George H. Sauton
By
Attorney May 4, 1926.
G. H. SAUTON
1,583,608
ELECTRIC METER PROTECTING MEANS
Filed August 4, 1924
3 Sheets-Sheet 2
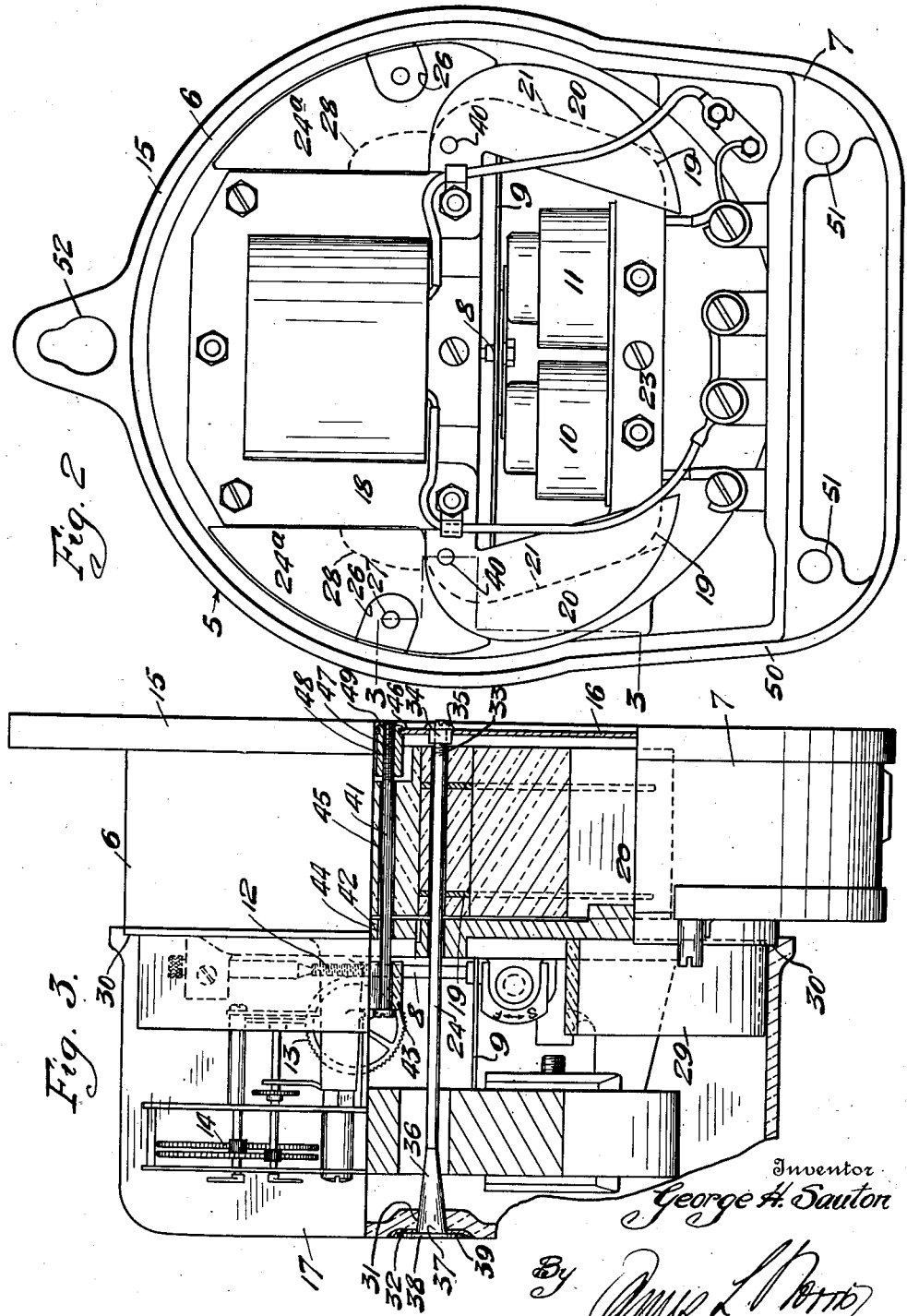

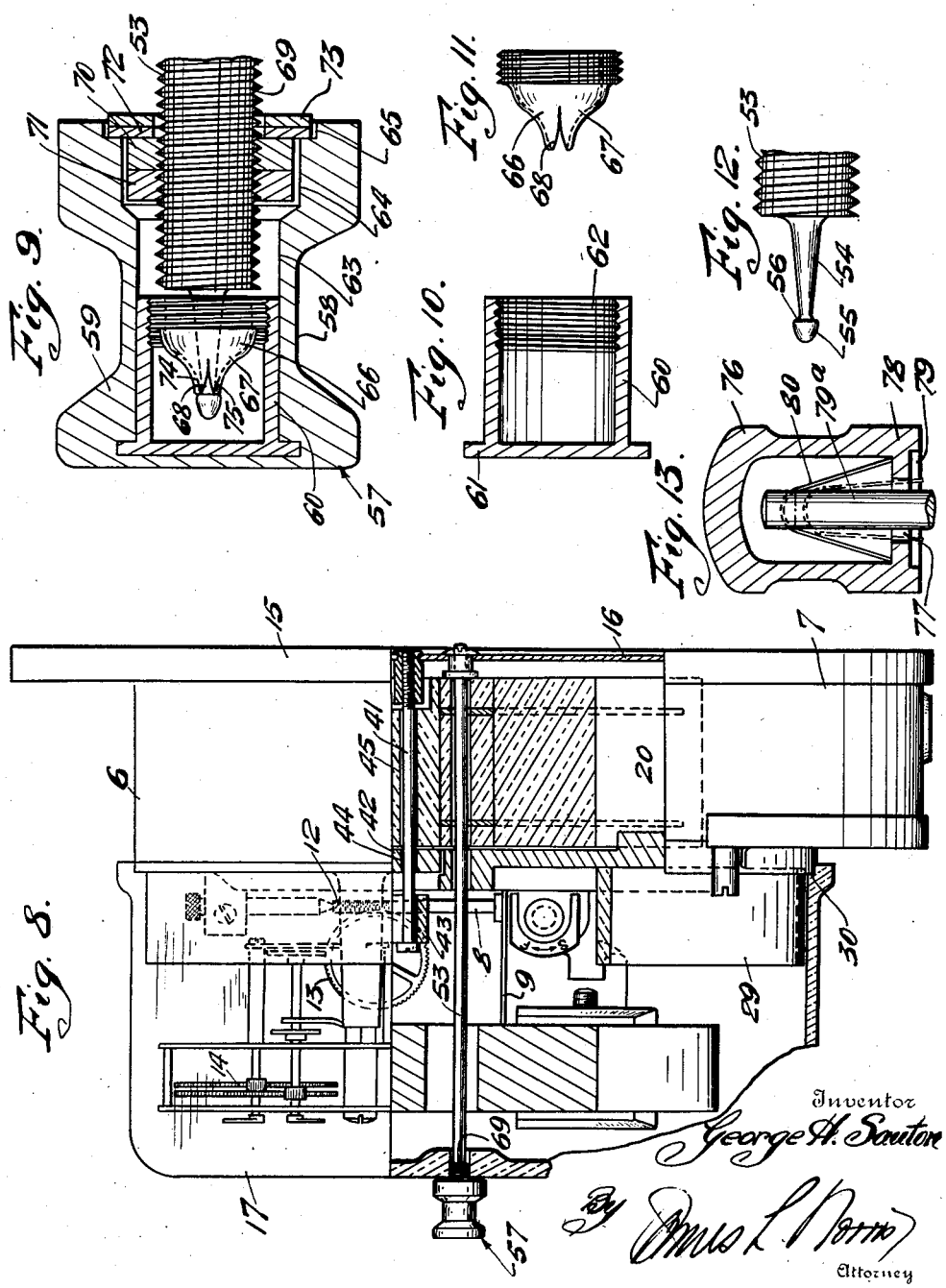

Patented May 4, 1926.

1,583,608

UNITED STATES PATENT OFFICE.

GEORGE H. SAUTON, OF NEW ORLEANS, LOUISIANA, ASSIGNOR OF ONE TWENTY-FOURTH TO CHARLES F. A. HEITKAMP, ONE TWENTY-FOURTH TO SIMON A. G. HEITKAMP, AND ONE TWENTY-FOURTH TO OSCAR R. L. HEITKAMP, ALL OF NEW ORLEANS, LOUISIANA.

ELECTRIC-METER-PROTECTING MEANS.

Application filed August 4, 1924. Serial No. 730,034.

*To all whom it may concern:*

Be it known that I, GEORGE H. SAUTON, a citizen of the United States, residing at New Orleans, in the parish of Orleans and State of Louisiana, have invented certain new and useful Improvements in Electric-Meter-Protecting Means, of which the following is a specification.

This invention relates to electric meter protecting means for use with all classes of electric and analogous meters to which it may be applicable, but particularly adapted for meters of that type comprising a rotary mechanically controlled damping disk or analogous movable component operatively associated with registering mechanism.

The present invention embodies features of improvement on the construction disclosed by my pending application Serial No. 582,670, filed August 18, 1922.

As specified in my pending application above noted, considerable financial loss to railroad and other companies or corporations engaged in the generation and service of electric current for municipalities, communities in general, manufacturing plants and the like using electricity for lighting, heating, motor and other purposes ensues, due to unauthorized and nefarious manual modification and tampering with mechanism of electric meters through means introduced between a service main and individual current service installations, to effect falsification of the meter registration and to correspondingly reduce the cost of the current used relatively to the amount of current that has been actually used and which would be correctly registered by such altered meter if the latter was permitted to normally operate.

Numerous methods have been adopted to check the operations of the rotary damping disk or other correspondingly movable part of the electric meter, to slow up the operation of the said disk or part and modify the showing of the registering mechanism without impairing the current supply through the meter, the most common practices being to introduce various devices and particularly small wires in such positions as to bear against the rotary disk or movable part of the meter with sufficient frictional pressure to check the normal registering movement of the said disk or movable part, and in some instances, also, pieces of cord or thread have been introduced into the meter for the same purpose, either through openings drilled in the casing or through joints of the meter. Another practice has been to remove a meter from its support and disconnect the back closure plate, to give access to the interior mechanism and thereby permit insertion of various devices between the damping disk and an adjacent fixed part actuating the registering mechanism, or, to reverse the operation of the mechanism and reduce the record showing the amount of current used.

The main objects of the present invention are, to equip an electric meter with structural features which will protect or shield the working parts thereof and prevent boring openings completely through the said parts, and to extend the protecting or shielding devices relatively to the rear parts of the meter mechanism, so as to wholly cover the latter and obstruct access to the meter working parts from the exterior by means of openings through the casing or through the joints; to occlude the openings for the fastening devices or bolts around the latter by completely filling the same in a particular manner and prevent separation of the back of the meter casing by the practice of ordinary mechanical methods, and also to protect and shield the front portion of the meter by an encircling means to render access to the working parts of the meter at any point from the exterior of the enclosing means of the meter or through joints thereof practically impossible, and to so apply the improved structural protecting features as to avoid the least modification or interference with the standardized meter construction and thereby effect and conserve an accurate registration of the amount of current used, with the possibility of making a correct meter charge in accordance with agreements as to service rendered.

With these and other objects and advantages in view, the invention consists in the construction and arrangement of the several parts which will be more fully hereinafter described and claimed.

In the drawings:

Fig. 1 is a front elevation of an electric meter having the improved protecting means applied thereto;

Fig. 2 is a rear elevation of the meter with the back plate removed and illustrating particularly the opposite side guards or protectors for the damping disk or main operating part of the meter with their extensions forming one of the particular means of the improvement in the present construction;

Fig. 3 is a side elevation of the meter, showing a portion thereof in section on the line 3—3, Fig. 2, the front glass enclosing globe being broken away and shown in section completely to its lower limit;

Figs. 4, 5, 6 and 7 are detail views of parts of the present improvement respectively shown in side and face elevation;

Fig. 8 is a view similar to Fig. 3, showing a modification in the means for securing or locking the screw rods in applied position in connection with the glass globe and remaining part of the meter;

Fig. 9 is a detail longitudinal section on an enlarged scale, showing a part of one of the screw rods and a modified form of locking means therefor;

Figs. 10 and 11 are detail views on an enlarged scale, showing parts of the modified locking means for the screw rods;

Fig. 12 is a detail elevation of a portion of one of the screw rods, showing the locking shank therefor used in connection with the modified structure shown by Figs. 8 to 11, inclusive; and Fig. 13 is a detail sectional view, showing a further modification of a part of the locking means.

In the drawings one form of electric meter is shown to which the improvements may be applied, and the meter as illustrated embodies a damping disk or analogous movable part magnetically influenced and actuating the registering mechanism in a well known manner, but the invention in view of its intended general application is not limited to any precise form of construction and organization of meter, and in describing the improved features applied to the particular form of meter shown as will be hereinafter set forth, it should be understood that one development only is adopted for the purpose of demonstrating a convenient and effectively acting arrangement of the improved protecting means.

Referring to the form of meter shown, the numeral 5 designates a casing having a substantially circular body 6 with a depending member 7, to accommodate the several components and electric connecting devices embodied in this type of meter. A shaft 8 mounted for free rotation is disposed in the center of the casing and has a damping disk 9 secured thereto and freely movable between and within electromagnets 10 and 11, which are provided with suitable windings and disposed and operate as well understood in the art. The shaft 8 has screw or worm threads 12 formed on a portion thereof, as shown by Fig. 3, to cooperate with a train of gearing 13 for actuation of registering mechanism 14. The operation of this meter will be readily understood, but briefly explained the damping disk 9 is rotated through magnetic influence by the current passing through the meter or traversing the course of the electrical connections as usual in devices of this type, the rotation of the disk 9 in turn actuating the registering mechanism through the shaft 8 and train of gearing 13 to show the amount of current used in accordance with the scale of measurement adopted and which is usually in kilowatt hours. The casing has a rear flange 15 which assists in the application and securement of the same against a suitable support and is also closed at the rear by a back plate 16 which is snugly fitted therein and is normally located adjacent to the support for the meter. Over the front of the meter of the type shown a glass globe or casing 17 is fitted, and in some instances it will be understood that this globe instead of being made of glass as an entirety is constructed of metal and provided with a sight glass over the dial of the registering mechanism. The electromagnet organization has associated therewith frame plates 18 with lower downwardly converging side members 19 between which the damping disk is mounted to rotate. These frame plates 18 are duplicated at the front and rear and held rigid within the substantially circular body 6 of the casing 5. The front glass globe or casing 17 is usually secured by screw rods 24 extending therethrough and between the parts of the meter in the front and through the lower converging members 19 of the frame plates 18, the rear ends of these screw rods projecting through the back plate 16 and having nuts ordinarily applied thereto and easily removed. Moreover, in the usual construction of this type of meter the lower downwardly converging members 19 of the frame plates 18 have clear spaces between them, and therethrough the damping disk 9 is exposed at opposite portions of the casing. The structural features of the electric meter thus far described form no part of the invention and are well known in the electrical art, and in applying the improved protecting means as will be presently explained, no modification of the general organization of the meter construction is necessary.

One of the principle features of the improved protecting means consists of side guards or protectors 20 inserted between and extending over portions of the lower converging members 19 of the frame plates 18 and formed of glass or any hard material that will resist penetration by a drill or analogous boring implement or means. There is one of these protectors located at each side of the meter mechanism between the frame members as above set forth, and to adapt the guards or protectors 20 to fit over the edges of the members 19 and also the parts of the frame plates 18 above the said members, the said guards or protectors are formed with grooves 21 opening through their inner sides, as clearly shown by Fig. 5. The grooves 21 are of such depth as to completely cover the downwardly converging members 19 of the frame plates 18, as shown by Fig. 2, and said grooves also continue through the lower extremities of the guards or protectors 20 and provide slots 22, to facilitate convenience in application of the guards or protectors to the members 19. These guards or protectors 20 when applied extend below and inwardly a short distance relatively to the lower converging members 19 of the plates 18 and horizontal cross connecting members 23, which are continuous with the members 19 and form parts of the plates 18. The form of guards 20 shown and described in my pending application above specified occupy the space between the lower converging members 19 of the frame plates 18 and overlap or cover the said plates and thereby are less efficient in closing all possible entrances or openings that might give access to the working parts of the meter than in the present improved construction. The guards 20 in the present improvement also have upper extensions or sections 24ª closely associated therewith and formed with a diagonal recess 25, the extensions 24ª projecting upwardly over the opposite side edges of the upper extremities of the frame plates 18 as shown by Fig. 2 and serving as an additional protecting means. The extensions 24ª will be formed of the same hard or impenetrable material as the main guards or protectors 20, and the general outer edge contour of the assembled guards 20 and their extensions 24ª is such as to permit the latter parts to be inserted within the circular body 6 of the casing 5, and the outer edges of the extensions 24ª for a greater portion of their length have the same arc of curvature as the portion of the body 6 adjacent thereto, and said curved edges of the extensions are located adjacent to, or have bearing against, the inner curved surface of the body 6. Each extension 24ª, in addition to the recess 25, has a nut-receiving recess 26 which is diametrically opposite the recess 25, and extending from the recess 25 to the recess 26 and opening into both recesses is a bolt bore 27. Each extension 24ª also has a lug 28 at one side, as shown by Figs. 4 and 5, to snugly fit against the usual variation in thickness of the wall between the rear and front portions of the meter to assist in maintaining the upper extension 24ª in place and properly associated with the lower protector or guard 20 when each guard and its extension are fitted in the meter and properly set, as clearly shown by Fig. 2. By means of the guards or protectors 20 and their extensions 24ª, the damping disk 9 is fully shielded at the rear portion of the meter, or in rear of the vertical plane of the shaft 8, and access to the vitals of the registering mechanism and gear means for operating the latter mechanism is also rendered impossible by the guards or protectors 20 and the extensions 24ª by unauthorized persons, particularly when the meter is applied and the rear closure or back plate 16 located closely against the supporting means for the meter as a whole. The guards or protectors 20 and extensions 24ª serve as a unit means to shield and prevent engagement with the working parts of the meter as above specified at points above and below the damping disk 9, the extensions 24ª in addition to shielding the said damping disk also protecting the registering mechanism at opposite parts of the meter where in ordinary meter constructions it is possible to effect an entrance and interference with the operation of the registering mechanism by inserted wires or other analogous devices.

In addition to the guards or protectors 20 and extensions 24ª, the present improved protecting means for electric meters of the type specified comprises a guard band or ring 29 of such diameter as to snugly bear against the side wall of the glass or transparent globe 17, as clearly shown by Figs. 1 and 3. The protecting band or ring 29 is of such width as to project well forward within the globe 17 from the intermediate portion of the meter, or at the point where the forward parts or front sides of the guards or protectors 20 and extensions 24ª terminate. The protecting band or ring 29 encircles the registering mechanism and also portions of the gearing for operating the latter and also provides an additional inner seal or covering means for the joint between the side wall of the globe 17 and the front edge of the casing 5, as at 30, see Fig. 3. By thus covering the joint between the side wall of the globe 17 and the front edge of the casing 5, the insertion of a wire or other analogous device through the joint thus formed is obstructed by the band or ring 29. It will be understood that this band or ring 29 will be formed of hard metal or other material that will resist penetration from the exterior of the meter at such points as might otherwise escape the notice of an inspector or other person authorized to examine electric meters in behalf of the owners of such meters.

The screw rods 24 extend fully through the meter in a transverse direction and in parallel planes, and each rod is inserted through an opening 31 in the front face of the glass globe 17 which is formed in the center of a depression 32, as shown by Fig. 3, the depressions 32 with their central openings 31 being disposed at equal distances on opposite sides of the center of the said front face of the globe. The rear extremities of the rods 24 are screw-threaded, as at 33, and thereover are applied cap nuts 34 which have outer heads 35 bearing against the rear side of the back plate or closure of the casing 5. The said rods 24 are formed, as in my pending application hereinbefore noted, to contribute to the protection of the meter and each has the shank thereof provided at its outer end with an elongated tapered enlargement 36 having its maximum diameter 37 snugly fitting in the outer portion of the opening 31 and completely filling the latter, the said opening being correspondingly tapered. On the outer end of each rod 24 and connected at its center to the maximum diameter 37 of the elongated tapered enlargement 36 is a flat head 38 of rather large diameter as compared with the heads of these rods as ordinarily formed so as to very nearly take up the full area of the depression or seat 32, a disk of suitable flexible material or fabric being inserted between the head and the base of the depression, as at 39. By the formation of the elongated tapered enlargement 36 as the outer part of the shank of each rod 24 and the provision of the enlarged flat head 38 together with the interposed fabric member or washer 39, the opening 37 is fully shielded and all attempts to insert wires or like devices through this opening will be defeated. Each rod also passes through an opening 40 in the upper part of each guard or protector 20 and through the back plate or rear closure of the casing 5, as hereinbefore explained, and after the two rods 24 have thus been applied, the cap nuts 34 are screwed inwardly over the rear screw-threaded extremities 33 thereof until a small portion of the rear ends of the rods project beyond the flanges 35 of said cap nuts, when the rods are finally locked and the cap nuts prevented from being separated from the rods by upsetting or swaging the projecting end portions of these rods over against the said flanges. In order, therefore, to remove the back plate or closure of the casing 5 by authorized persons, it will be necessary to first cut or file off the upset rear ends of the rods so as to permit the cap nuts to be withdrawn. Unauthorized persons attempting to gain access to the interior of the meter by removing the plate would be compelled to pursue the same course as just specified, and it is obvious that such course would no doubt be discovered before the back plate or closure was successfully removed.

As an additional securing means for the back plate or closure of the casing and the extensions 24ª, elongated bolt rods 41 are inserted through lugs 42 projecting inwardly from opposite points of the front portion of the body 6 of the casing 5, the said lugs fitting in the recess 26 in the adjacent front sides of the extensions 24ª of the guards or protectors 20. The forward extremities of the rods 41 engage securing hooks or keepers 43 extending inwardly from opposite parts of the band or ring 29 nearer the rear edge of the latter and in line with openings 44 through the lugs 42 for the rods 41, the heads of the said rods 41 bearing against the outer sides of the hooks or keepers 43, as shown by Fig. 3. The rods 41 also pass through openings 45 in the extensions 24ª in alinement with the openings 44 in the lugs 42 and then continue through suitable enlarged openings 46 in the back plate or closure of the casing. The rear extremities of the rods 41 are screw-threaded, as at 47, and receive sleeve nuts 48 with outer heads secured in the openings 46 against the back plate or closure, as at 49. The sleeve nuts 48 extend into the recess 25 in the extensions 24ª, said recess 25 giving the nuts ample clearance for operation in their application to the rear threaded extremities of the rods 41. It will be seen that the rods 41 can be removed only after the rods 24 have been disconnected or released and the glass or transparent globe 17 detached from the casing 5, and as a consequence, the back plate or closure of the casing remains intact with the latter until the rods 41 are disconnected. The rods 41 also hold the extensions 24ª snugly in place and are themselves protected by their projection through these extensions, and, likewise, the rear portions of the rods 24 are shielded or covered by their insertion through the upper portions of the guards or protectors 20.

In addition to the structural features heretofore explained, the casing 5 will be equipped with a surrounding flange 50 which at the bottom is of open structure and has suitable screw holes 51 formed in portions of the flange to facilitate application and support of the meter against a wall or other holding means, the upper part of the flange being continued into a hanger eye 52, as clearly shown by Figs. 1 and 2.

From the foregoing it will be seen that it will be impossible to insert a wire or other implement from the sides of the casing 5 or the glass globe or casing 17, or through the joints of the latter, either in a straight horizontal direction or a vertical direction or in diagonal directions. Furthermore, access to the working parts of the meter by removing the back plate or closure 16 is completely obstructed, and as a consequence, the damping disk 9 and the registering mechanism and its gearing will all be shielded and held in a safely enclosed condition by the several features of improvement hereinbefore specified.

Figs. 8 to 12, inclusive, show modified structures for securing and positively retaining the screw rods for holding the glass globe over the remaining part of the meter and also embodying the features of the invention. The remaining parts of the structure used in connection with this modified form of screw rod securing means is identical with that heretofore described and the similar parts illustrated by Fig. 1 have been designated by the same reference characters as in the preceding figures. In this instance each screw rod 53 is mainly the same as the screw rods 24 heretofore described, the modification being in forming the front ends or extremities of said rods with reduced tapered shanks 54 having heads 50 of convex curved contour and a shoulder 56. The tapered shank 54 with the head 55 replaces the flat head 38 and elongated tapered enlargement 36 heretofore explained, and each of the shanks and heads 54 and 55 is engaged by a locking cap of the form shown in elevation in Fig. 8 and in section by Fig. 9. This cap is generally designated by the reference character 57 and is preferably shaped as shown, or provided with an intermediate circumferential recess 58 for convenience in gripping and holding the same. It is preferred that the body 59 of this cap be formed of plastic material and baked, or of porcelain or any other similar material, and therein is disposed during the operation of forming the body a porcelain or other socket or cup 60 having a flanged closed end 61, which is secured in the material of the body as shown by Fig. 9, the opposite end of the socket being fully open and interiorly screw-threaded as at 62. The socket or cup 60 is disposed in a central bore 63 extending out through the rear end of the said body 59 and increasing in diameter, as at 64 and 65, towards the rear outlet. Within the socket 60 a spring locking cap is mounted and comprises an exteriorly screw-threaded collar 66 and a resilient tapered head 67 having a slotted or slit reduced end 68. This cap is hollow and is adjustably mounted within the socket 60 by the screw threads of the collar 66 engaging the screw threads 62 of said socket. The outer extremity of each screw rod 53 is exteriorly screw-threaded, as at 69, just in rear of the shank 54 and has mounted thereon a nut 70 with a cooperating jamb nut 71, the nuts 70 and 71 occupying the diametrically increased portion 64 of the bore 63, this enlarged portion 64 of the bore providing a seat for these nuts. The nuts 70 and 71 engage the screw threads 69 of each screw rod 53 as shown by Fig. 9 and hold the same in adjusted position relatively to the glass globe and the remaining parts of the meter members or frame engaged by the screw rod. The nut 70 is caused to bear against an inner steel washer 72 loosely mounted over the screw-threaded extremity of each rod 53 and against the inner side of the steel washer 72 is a rubber or analogous washer 73, which engages the glass globe around the openings in the latter through which the screw-threaded extremity of the rod 53 extends. The diametrically inner enlarged portion 65 of the bore 63 forms a seat for the washer 72 and for a portion of the washer 73, the latter washer being pressed closely against the outer side of the glass globe around the opening therein through which the forward end of the screw rod 53 projects, and when the nut 70 is tightened up and jammed by the nut 71, the screw rod will be firmly secured, and to complete the lock and render the same proof against irregular manipulation, the cap 57 is applied over the outer screw-threaded extremity of the rod 53 with considerable force, so as to cause the head 53 of the shank 54 to pass through the slotted end of the spring head 67 of the locking cap mounted in the socket 60. As soon as the shoulder 56 of the head 55 on the shank 54 passes through the slotted head, the latter resumes its normal position and the two resilient jaws 74 and 75 formed by the slot 68 have their ends bearing against opposite portions of the shoulder 56 and thereby inseparably secure the cap 57 and the parts carried thereby over the outer screw-threaded extremity of the rod 53 and also over the shank 54 and head 55 and tightly cover the opening through which the outer extremity of said rod 53 projects, and thus render the introduction of any wire or other implement through the said opening absolutely impossible and defeat the efforts of anyone to manipulate or change the registration of the meter. This locking cap construction, as will be understood, is applied to the outer projecting end or extremity of each screw rod 53, and when the parts have been assembled as shown by Figs. 1 and 9, it will be impossible to detach the cap except by breaking the same, in view of the fact that the cap cannot be removed by rotating the same for the reason that the jamb nut 71 locks the parts and obstructs any loose action after final adjustment and application of the cap to each screw rod has been made. This form of locking means for the screw rods is very advantageous and will be adopted more generally than the form of flat disk-like head and tapered enlargement at the outer end of each pin as heretofore described. If the cap 59 should become broken or fractured in an attempt to irregularly manipulate the registering means of the meter, the broken condition of the parts will be at once discernible by an inspector having authority, and moreover, in view of the particular construction and arrangement of parts of this cap, including the locking means therein, it will be practically impossible to replace the same with a similar device. It is also proposed if desired and found necessary to number the caps and register each one as a further means of accurate identification and as an additional precaution against irregular practices.

In Fig. 13 a further modification of the locking means for each screw rod is shown and consists of a hollow locking cap 76, closed at one end and having an opening 77 through the opposite end of less diameter than that shown by Fig. 9, the said opening 77 being formed through a cross web which provides an annular shoulder 78, the cap at the outer side of the cross web being formed with a recess 79 for application thereto of the washers heretofore described and as shown by Fig. 9. The rod 79ª in this instance has an engaging locking spring 80 associated therewith, the said spring diverging and having its terminal bearing against the inner side of the annular shoulder 78, so that when the rod is inserted through the opening or bore 77, the said spring will expand and lock the rod within the cap 76, or prevent the said cap from being withdrawn from the rod without mutilating the same to such an extent as to be readily discernible.

What is claimed as new is:

1. The combination with an electric meter having registering mechanism and a movable part magnetically controlled to effect registration of the amount of current passing through the meter and used, of protective means disposed adjacent to opposite portions of the said movable part both at the rear and front portions of the latter and resisting boring operations to prevent tampering with said part from the exterior of the meter.

2. The combination with an electric meter having registering mechanism and a magnetically controlled movable part operable by the current used for actuating said mechanism, of protective means within the meter arranged above and below the rear and front portions of said movable part to shield the latter to prevent unauthorized tampering therewith from the exterior of the meter.

3. The combination with a meter having an enclosing casing, registering mechanism and a magnetically controlled movable part operable by the electric current passing through the meter for actuating said mechanism, of means mounted adjacent to and above and below and around different portions of the said movable part to prevent tampering with the latter from the exterior of the casing.

4. The combination with an electric meter having a casing, a magnetically controlled rotatable disk, registering mechanism actuated by said disk and mechanism for operating the registering mechanism from the disk, of guard devices formed of material difficult of penetration and disposed adjacent to opposite portions of the disk above and below the latter and also around parts of the same and also around parts of the operating mechanism within the casing to prevent access to the disk and said mechanism from the exterior of the casing.

5. The combination with an electric meter having a casing with front and rear enclosing devices, a movable magnetically controlled member within the casing, registering mechanism and means interposed between the said member and registering mechanism for actuating the latter, of guard means disposed adjacent to opposite portions of the movable member and above and below the latter and disposed in the rear enclosing device, guard means surrounding the front portion of the member and a part of the interior operating means of the meter, and securing means extending through the enclosing devices and the interior of the casing and through said guard means, the securing means being provided with enlargements at their outer extremities for snugly closing the openings through which they pass and provided with securing means at their opposite ends for preventing disconnection thereof from the casing by obstructing easy release of the parts of the securing means from the exterior of the casing.

6. The combination with an electric meter having a magnetically controlled operable part, registering mechanism and mechanism for transmitting the motion of the said part to the registering mechanism, of protecting means within the front portion of the meter and surrounding the said movable part and adjacent mechanism to shield the said part and mechanism and prevent tampering therewith from the exterior of the meter.

7. The combination with an electric meter having a magnetically controlled movable part, registering mechanism and operating mechanism for transmitting the motion of the movable part to the registering mechanism, of protecting means within the meter arranged at opposite points with relation to the movable part and also above and below said part to shield the latter and prevent tampering therewith from the exterior of the meter.

8. The combination with an electric meter having registering mechanism and a magnetically controlled movable part operable by the current used for actuating said mechanism, of protective means in the form of a band disposed within the meter around a portion of the said movable part to shield the latter and the registering mechanism and prevent unauthorized tampering therewith from the exterior of the meter.

9. The combination with an electric meter having a magnetically controlled movable part, registering mechanism and operating mechanism for transmitting the motion of the movable part to the registering mechanism, of protecting means within the meter in the form of an impenetrable guard arranged at opposite points with relation to the movable part and having upper extensions to fully protect said part above and below the same and prevent tampering therewith from the exterior of the meter.

10. The combination with an electric meter having a magnetically controlled movable part, registering mechanism and operating mechanism for transmitting the motion of the movable part to the registering mechanism, of protecting means within the meter in the form of guards formed of a material difficult of penetration and arranged at opposite points with relation to said movable part and provided with upper extensions to fully shield the movable part at opposite points and above and below the latter, and a surrounding guard in the form of a band in advance of the said guards with the extensions to further shield and protect the movable part and the mechanism cooperating therewith and prevent tampering with the said part or mechanism from the exterior of the meter.

11. The combination with an electric meter having a casing with a removable back, registering mechanism and a magnetically controlled movable part operable by the current used for actuating said mechanism, of rear protective means within the casing disposed in relation to opposite portions of the movable part and having upper extensions to fully protect the said part, a surrounding band in advance of the rear guards and extensions and also shielding the said movable part and the mechanism cooperating therewith, fastening means inserted from the interior of the electric meter and engaging the said band and the guards in rear thereof and secured to the back of the casing, and other fastening means extending fully through the casing within the band and through the guards in rear of the band and also secured to the said back.

12. The combination with an electric meter having a casing with front and rear enclosing means and an inner frame composed of spaced members supporting parts of the meter, a movable magnetically controlled member within the casing, registering mechanism and operating mechanism interposed between the said member and registering mechanism, of rear guards having grooves to receive the edges of the frame members and provided with upper extensions which are shaped to snugly fit close to the upper parts of the frame members whereby the rear portion of the magnetically controlled member is fully shielded at diametrically opposite points and above and below the said member, a band surrounding the member in advance of the guards and their extensions, and fastening devices extending through parts of the meter and the guards and extensions for holding the several units of the meter and the guards and band in associated relation and against displacement by unauthorized persons.

13. The combination with an electric meter having an enclosing casing, registering mechanism and a magnetically-controlled movable part for actuating said mechanism, of protecting means within the casing and arranged to shield said movable part and prevent tampering therewith from the exterior of the casing.

In testimony whereof I have hereunto set my hand.

GEORGE H. SAUTON.